United States Patent [19]
Holt et al.

[11] Patent Number: 5,893,893
[45] Date of Patent: Apr. 13, 1999

[54] DEVICE FOR THE COMPUTERIZED RECORDING OF MILEAGE AND EXPENSES IN VEHICLES

[75] Inventors: Gregory A. Holt, Louisville; Elden E. DuRand, Crestwood, both of Ky.

[73] Assignee: Autotronics, Inc., Louisville, Ky.

[21] Appl. No.: 08/124,361

[22] Filed: Sep. 20, 1993

Related U.S. Application Data

[63] Continuation of application No. 07/927,244, Aug. 7, 1992, abandoned, which is a continuation of application No. 07/771,511, Oct. 1, 1991, abandoned, which is a continuation of application No. 07/529,937, May 29, 1990, abandoned.

[51] Int. Cl.$^6$ ............................................ G01C 21/00
[52] U.S. Cl. ............................................................ 701/35
[58] Field of Search ................................. 364/406, 408, 364/424.04; 324/166, 244, 174, 167, 173

[56] References Cited

U.S. PATENT DOCUMENTS

| | | | |
|---|---|---|---|
| 4,067,061 | 1/1978 | Juhasz | 364/900 |
| 4,192,006 | 3/1980 | Hausdorff | 364/408 |
| 4,382,178 | 5/1983 | Mori | 377/24.1 |
| 4,532,710 | 8/1985 | Kinney et al. | 377/24.1 |
| 4,642,787 | 2/1987 | McCarthy et al. | 235/97 |
| 4,646,042 | 2/1987 | Eshelman | 335/205 |
| 4,677,429 | 6/1987 | Glotzbach | 364/424.04 |
| 4,852,000 | 7/1989 | Webb et al. | 364/406 |
| 4,939,652 | 7/1990 | Steiner | 364/424.04 |

*Primary Examiner*—Kevin J. Teska
*Assistant Examiner*—Leigh Marie Garbowski
*Attorney, Agent, or Firm*—Baker & Botts, L.L.P.

[57] ABSTRACT

A vehicular recording device for computerized recording of mileage expenses. This device provides a unique and useful device for storing a significant amount of data about trips made in a vehicle, including mileage, the characterization of the mileage as personal, business, charitable or other, expenses incurred during travel in the vehicle such as for gasoline, oil and other vehicular expenses and also non-vehicular expenses incurred during a trip. Once the information is recorded into the recordation and storage device it can be transferred to a personal computer to provide a detailed printout of all expenses and other data related to the travel. This new and unique device has significant application for both car and truck travel, it provides a significant number of options for the data to be entered into the device.

8 Claims, 7 Drawing Sheets

DEVICE FOR THE COMPUTERIZED RECORDING OF MILEAGE AND EXPENSES IN VEHICLES

CROSS REFERENCE TO RELATED APPLICATIONS

This application is a continuation of application Ser. No. 07/927,244 filed Aug. 7, 1992, entitled "Device for the Computerized Recording of Mileage and Expenses in Vehicles" by Gregory A. Holt and Elden E. DuRand, abandoned Sep. 20, 1993, which is a continuation of application Ser. No. 07/771,511 filed Oct. 1, 1991, entitled "Device for the Computerized Recording of Mileage and Expenses in Vehicles" by Gregory A. Holt and Elden E. DuRand, abandoned Aug. 7, 1992, which is a continuation of application Ser. No. 07/529,937 filed May 29, 1990, entitled "Device for the Computerized Recording of Mileage and Expenses in Vehicles" by Gregory A. Holt and Elden E. DuRand, abandoned Oct. 1, 1991.

BACKGROUND OF INVENTION

1. Field of Invention

This invention relates to vehicular recording devices. In particular, this invention relates to a vehicular recording device for the computerized recordation of mileage and expenses.

2. Prior Art

Devices for the recording of mileage in vehicles have been in existence for many years, particularly in the well known odometer field. In addition, devices which record time, distance and a charge for time and/or distance are quite common, specifically in vehicles such as taxicabs. See, for example, U.S. Pat. Nos. 3,188,647, 3,809,312, 4,643,787 and 3,742,514.

In addition, devices have been manufactured which display vehicle performance characteristics, such as vehicle speed, lapsed trip distance, engine rpm, fuel consumption, rate of fuel consumption and the like as a function of time, specifically for use with trucks. See, for example, U.S. Pat. Nos. 4,188,618, and 4,644,368.

Further, there have been designed devices to record mileage and expenses of trips. Businessmen have, by necessity, kept trip logs to record business miles, personal miles, charitable miles and expenses relating to each of these types of activities. For Internal Revenue Service purposes, breakdowns of mileage in these various categories must be contemporaneously kept and must provide an accurate list of all types of expenses incurred. As a result, there has been a need for a device which will record this type of information. See, for example, U.S. Pat. No. 4,875,167, 4,067,061, 4,072, 850, 4,344,136 and 4,593,263.

Of particular interest in this area are U.S. Pat. Nos. 4,547,781 and 4,755,832 which disclose devices for installation in a motor vehicle for recording distances traveled on business or personal trips. These patents disclose a device for measuring the distance traveled by a motor vehicle, a means for indicating that distance traveled, a keyboard consisting of exactly two separate keys, one to enter a character indicative of business and the other to indicate a character indicative of personal use, a decimal keypad, a keypad for entering the information, a clock for entering the time and a paper printer or paper supply means for printing out the information. This paper printer and paper supply method is replaced in the '832 patent with a readable, removable information storage system in the form of a non-volatile memory pack.

Each of these devices provides some useful elements for measuring characteristics of a vehicular trip. However, none provide the capability of storing and displaying through a programmable personal computer all of the following information in a readily accessible manner: current day's mileage for business, personal, charitable or other purposes; current weeks, months or year's mileage for business, personal, charitable and other purposes; current date, current time, an expense record showing the fuel expense, travel expense, repair and maintenance expense on a weekly, monthly or yearly basis as well as time designations. All of this information can be contained within computer memory storage within the instant invention in a random access memory component until such data is transferred to to a personal computer using custom software. This new and innovative device eliminates many of the mechanical flaws of previously designed products, lowers the cost of the product, eliminates the necessity of a magnetic storage device or a printer, is easy to operate, easy to maintain and produces a document containing all of the information necessary for Internal Revenue Service reporting, and for the personal records of the individual.

Therefore it is an object of this invention to provide a device for the storage and reproduction of data related to the operation of a vehicle.

It is a still further object of this invention to provide a device for the recording of vehicular information which is easy to use and inexpensive to produce.

It is a still further object of this invention to produce a device for the storage and reproduction of data relating to vehicular use which can easily and simply transfer that data to a personal computer for printout or storage.

It is a still further object of this invention to provide a device for the recordation, storage and reading of information relating to the operation of a moving vehicle which is easy to operate because of its menu driven capability.

These and other objects and features of the present invention will become apparent to those skilled in the art from a consideration of the following detailed description, drawings and claims. The description, along with the accompanying drawings, provides a selected example of construction of the device to illustrate the invention.

SUMMARY OF INVENTION

In accordance with the present invention there is provided a device for the recordation and storage of vehicular data for use in a vehicle comprising:

(a) a first input means securable to the vehicle for inputting information from said vehicle relating to the operation of said vehicle;

(b) a second input means operable by an occupant of the vehicle;

(c) a data storage and internal processing means attached to the first and second input means containing random access memory capability for receiving information from the first and second input means; and (d) a transfer means attachable to the data storage means for transferring data from the data storage means to an external data processing means.

In an alternative embodiment of this device, no first input means is used. The information from the vehicle is manually programmed into the data storage means from the second input means without providing a means attached to the vehicle for transferring that information to the data storage and internal processing means.

This device for the recordation and storage of vehicular data provides a unique and useful instrument for the recordation of vital information relating to the operation of a vehicle. For example, this device permits the recordation of vehicular data such as the personal, business and charitable miles driven by the vehicle, the expenses incurred for fuel, oil and other vehicular expenses and can also be used to record non-vehicular expenses incurred during a trip. Once the information is recorded in the recordation and storage device, it can be transferred to a personal computer to provide a detailed printout of all expenses and other data relating to the miles driven by the vehicle. This new and unique device has significant applications for both car and truck travel and provides a significant number of options for reproductions of the data.

BRIEF DESCRIPTION OF THE DRAWINGS

This invention will now be described with reference to the accompanying drawings in which.

DETAILED DESCRIPTION OF THE PREFERRED EMBODIMENT

Figure 1:
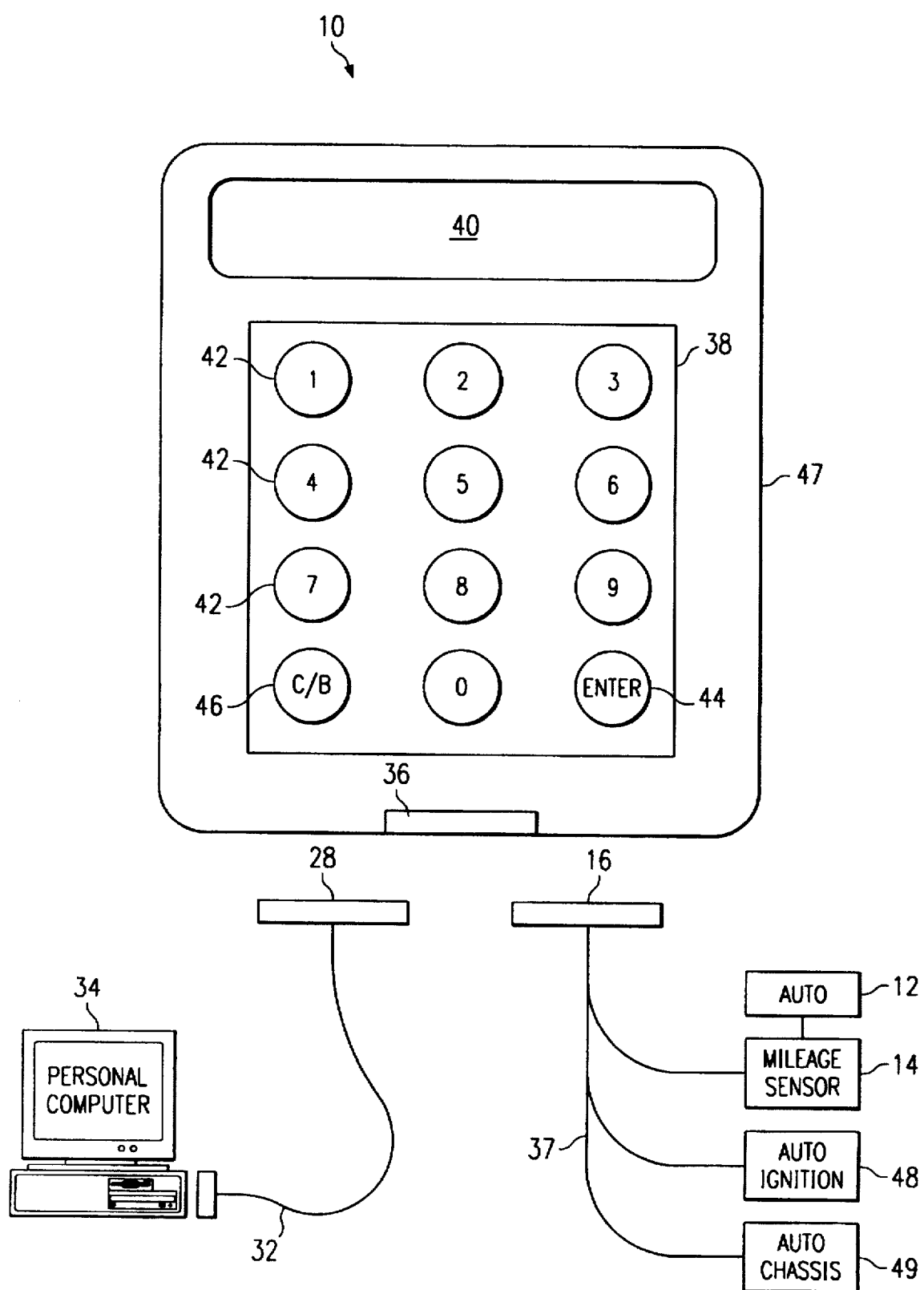
FIG. 1 is a schematic drawing of the device specifically showing the keyboard and keys of the second input means.

Although the invention is adaptable to a wide variety of uses it is shown for the purpose of illustration as a device for computerized recording of mileage and expenses (10) embodied in a first input means securable to a vehicle (12) for inputting information from said vehicle indicative of distance traveled by said vehicle; a data storage and internal processing means to which is connected the first input means which includes a random access memory means for storing and internally processing data; a second input means operable by an occupant of the vehicle for inputting data into the data storage and internal processing means; and a transfer means connected to the data storage and internal processing means for transferring data from the data storage and internal processing means to an external data processing means. See FIG. 1.

In one embodiment of the invention, the first input means is a mileage sensor (14) attached to the vehicle (12) for sensing the distance traveled by the vehicle. For example, the mileage sensor (14) can be comprised of a magnetic flux detector which detects the presence or absence of a magnetic field produced by the presence of a magnet or magnets attached to the driveshaft or axle of the vehicle, thus providing a measure of distance traveled by the vehicle. In an alternative embodiment, the first input means for inputting information from the vehicle indicative of the distance traveled by said vehicle may be an odometer reading device. The odometer reading device would be secured to the odometer cable of the vehicle, permitting the information running through the odometer cable to be conveyed into the data storage and internal processing means. Devices for detecting the distance traveled by a vehicle or for intercepting the data from an odometer cable are conventionally available and are well known to those skilled in the art.

The first input means sends its data to the data storage and internal processing means by conventional transfer methods, such as by cable, which is well known to those skilled in the art.

The data storage and internal processing means is comprised of a static random access memory (RAM) (16), a microcomputer (18), a real time clock (20), a voltage regulator (22), isolator (24), battery (26), port (28) and buzzer (30). Random access memory units (16) are well known to those versed in the art and are available from several manufacturers in various sizes and configurations. See FIG. 3. Although a wide variety of types of random access memory are available, due to the necessity to operate the device on power from the battery (26) Complimentary Metal Oxide Semiconductor (C-MOS) technology is the preferred technology because of it's low quiescent current requirements. The storage capacity of the random access memory (16) can be any conventional size well known to those in the industry or obvious to those producing this type of device. In a preferred embodiment the memory capacity should be at least about 16,384 bytes to 32,768 bytes. Obviously, increased storage capacity is possible with alternate embodiments.

The microcomputer preferably used in the device is a 4 byte or 8 byte C-MOS device having enough I/O capability to satisfy the requirements of the device such as is produced by Motorola Corporation or Texas Instruments, Inc.

The real time clock (20) used in the data storage and internal processing means is a conventional real time clock for use within data processing devices such as a MC146818 real time clock produced by Motorola Corporation.

The voltage regulator (22) isolator (24) and port (28) are conventional components of many data storage and processing units and are well known to those skilled in the art. For example, an acceptable voltage regulator would be any conventional three terminal voltage regulator such as is produced by National SemiConductor, an acceptable isolator would be composed of silicon diodes produced by various well known in the art manufacturers. The preferred port is a conventional I/O port which is an element of the preferred microcomputer. The buzzer is another conventional component well known to those skilled in the art and, for example, is a piezo electric anunciator buzzer such as is manufactured by MuRata-Erie and other well known companies.

To provide power for the data storage and internal processing means, there is provided a battery, preferably of the lithium type. This battery will be used, not only to power the operation of the random access memory, but also the display and all other operations of the data storage and internal processing means. In an alternative embodiment the data storage and internal processing means can be powered directly from the battery of the vehicle by conventional methods well known to those skilled in the art.

Secured to the data storage and internal processing means is a transfer means which permits the data contained within the RAM to be transferred to a conventional external data processing means. In a preferred embodiment, the random access memory has secured to it through the port an interconnecting data cable (32) which is of conventional construction. The interconnecting data cable can be secured to a conventional personal computer (34) to permit the uploading of information from the random access memory into the personal computer. See FIG. 1. Any conventional personal computer can be used which has preferably a standard RS232 serial data port for attachment of the interconnecting data cable.

There is provided software for programming the personal computer to receive the data contained within the random access memory. The programming of this software is conventional as is known to those skilled in the art of data transfer from one computing device, the data storage and internal processing means to another computing device, the conventional personal computer (34). The data may be condensed for transfer to the personal computer as is also well known to the industry.

In a preferred embodiment at any convenient time or when warned by the buzzer (30) the user can, by connecting the data storage and internal processing means to the personal computer (34) by means of the interconnecting data cable (32) and executing the program encoded into the external personal computer, cause the data storage and internal processing means to transfer the data from the random access memory through the microcomputer (18), port (28) and interconnecting data cable (32) to the personal computer (34). In a preferred embodiment the interconnecting data cable (32) has a connector at one end to connect the port (28) to the data storage and internal processing means and a conventional "D" type connector at the other end for uploading the data to a port of the personal computer (32).

In a preferred embodiment the data storage and internal processing means has secured to it a data transfer or receiving connector (36) which can be configured to permit data from the input means to be received through cable (37) to said data transfer and receiving connector (36) for processing through the microcomputer and storage in the RAM. In addition, the data transfer or receiving connector can also be used for attaching to the interconnecting data cable (32) to transfer the data contained within the RAM to the personal computer (34).

Secured to the data storage and internal processing means is the second input means operable by the occupant of the vehicle for inputting data into the data storage and internal processing means. This second input means is comprised of a keypad (38) and a display (40) for displaying the information to be entered by the second input means into the data storage and internal processing means. The keypad (38) is a conventional, pressure sensitive keypad using in a preferred embodiment 12 keys, 10 of those keys being conventional decimal keys with numbers 1 through 0. The eleventh key is an E key (44) or Enter key and the 12th key is a C/B or cursor/backspace key (46). See FIG. 1. The purpose of each of these keys will be explained later in this disclosure.

The display is preferably a display screen displaying information being inputted into the data storage and internal processing means by the second input means. The data is shown on the display (40) by use of any conventional display technique, such as an LCD display or a LED display as is well known to those skilled in the art.

In a preferred embodiment, the data storage and internal processing means and the second input means are both contained within a housing (47) of conventional size and shape operable for use within a vehicle. In a preferred embodiment the housing is approximately the size of a radar detector, and preferably, is about 2 to about 6 inches in length, 2 to about 6 inches in width and ½ to about 1½ inches in depth. The housing is manufactured from any conventional material, but to reduce the weight of the device is preferably made from a high quality thermoplastic material.

Figures 1, 2A:
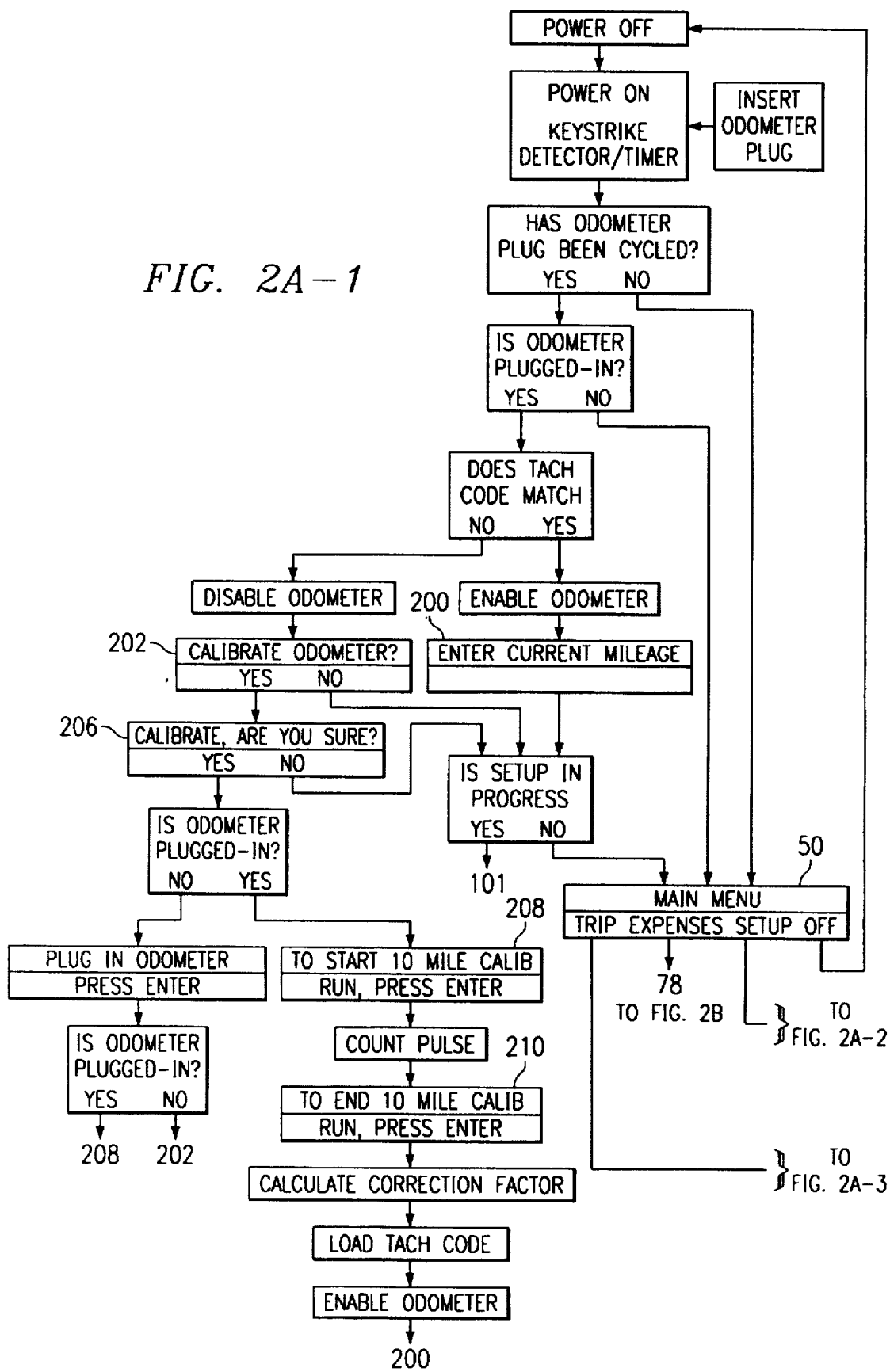
FIGS. 2A and 2B are functional block diagrams of the preferred logic tree used in the operation of this device.
Figures 2, 2A:
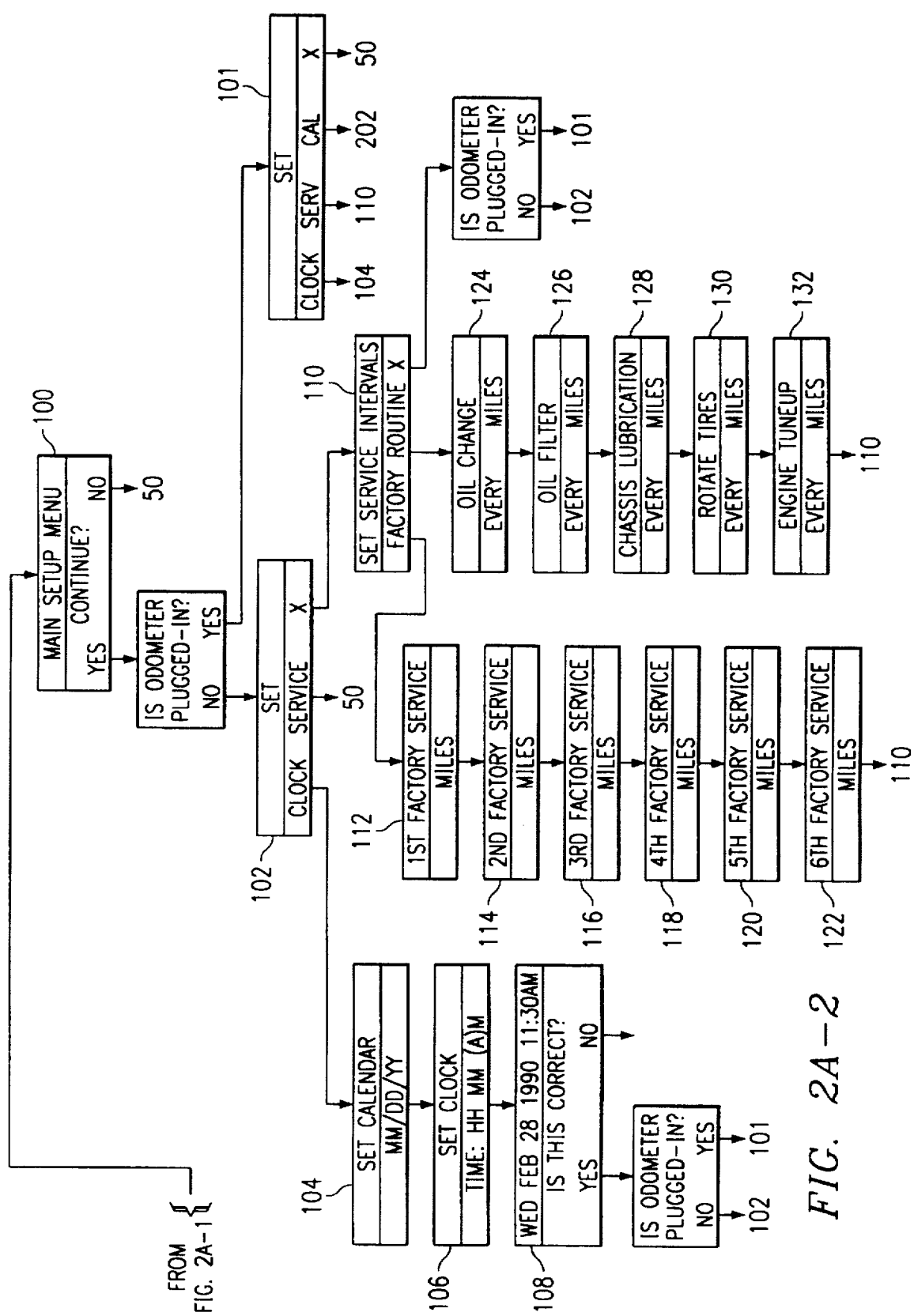
Figures 2, 2A, 3:
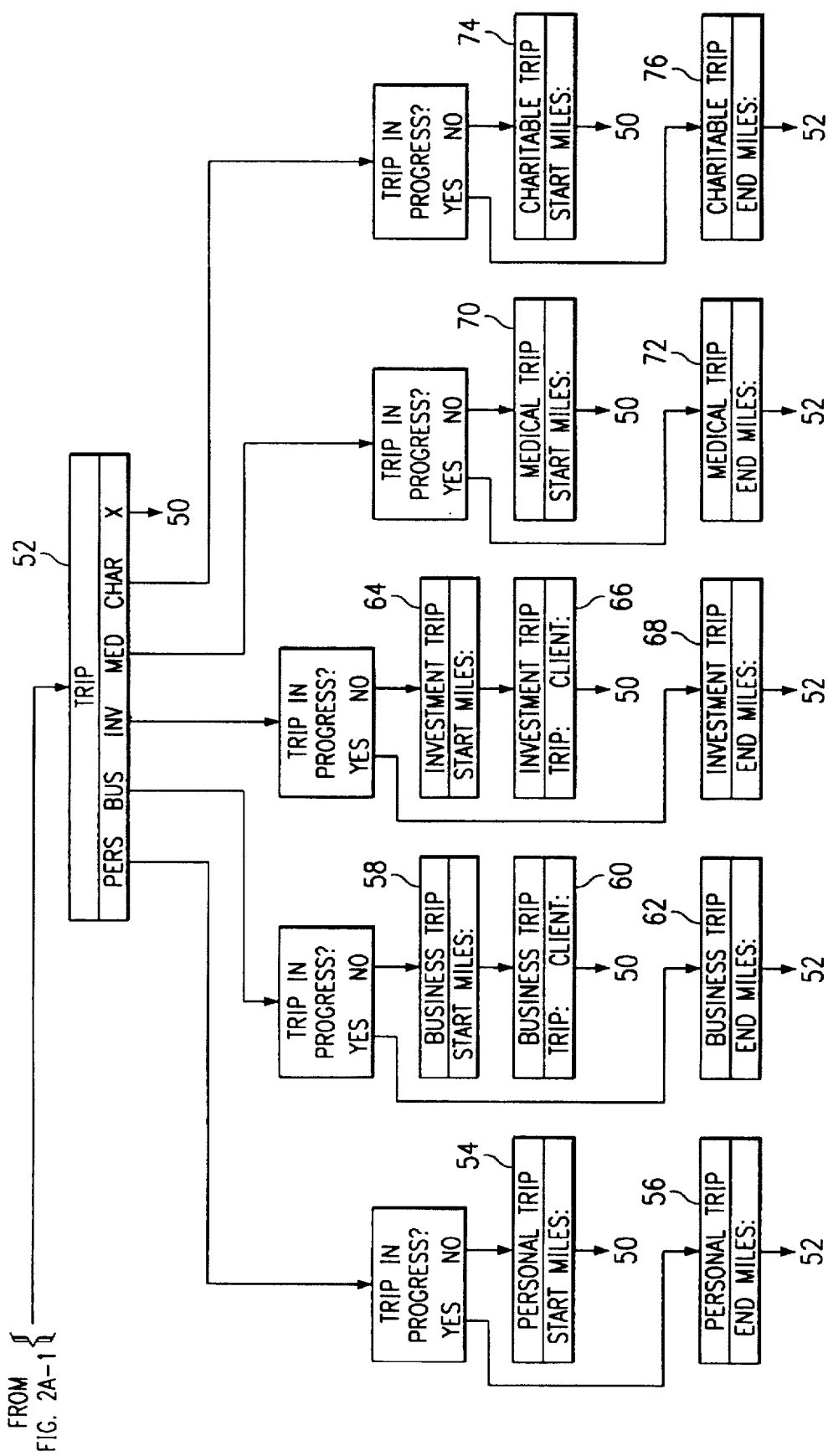
FIG. 3 is a detailed drawing of the operation of the device specifically showing the elements of the data storage and internal processing means of the device along with the interaction of the remaining elements of the device.
Figures 1, 2B:
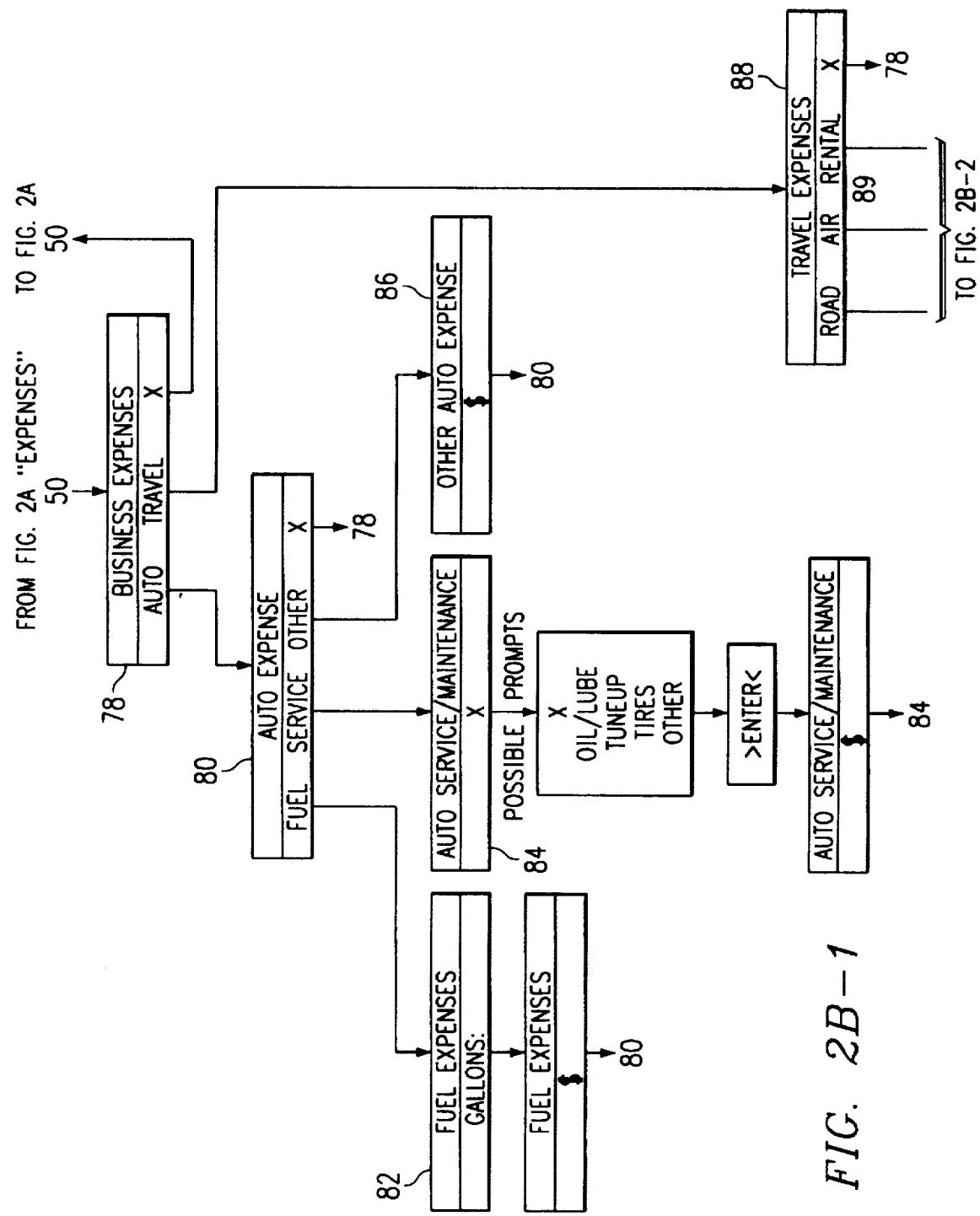
Figures 2, 2B:
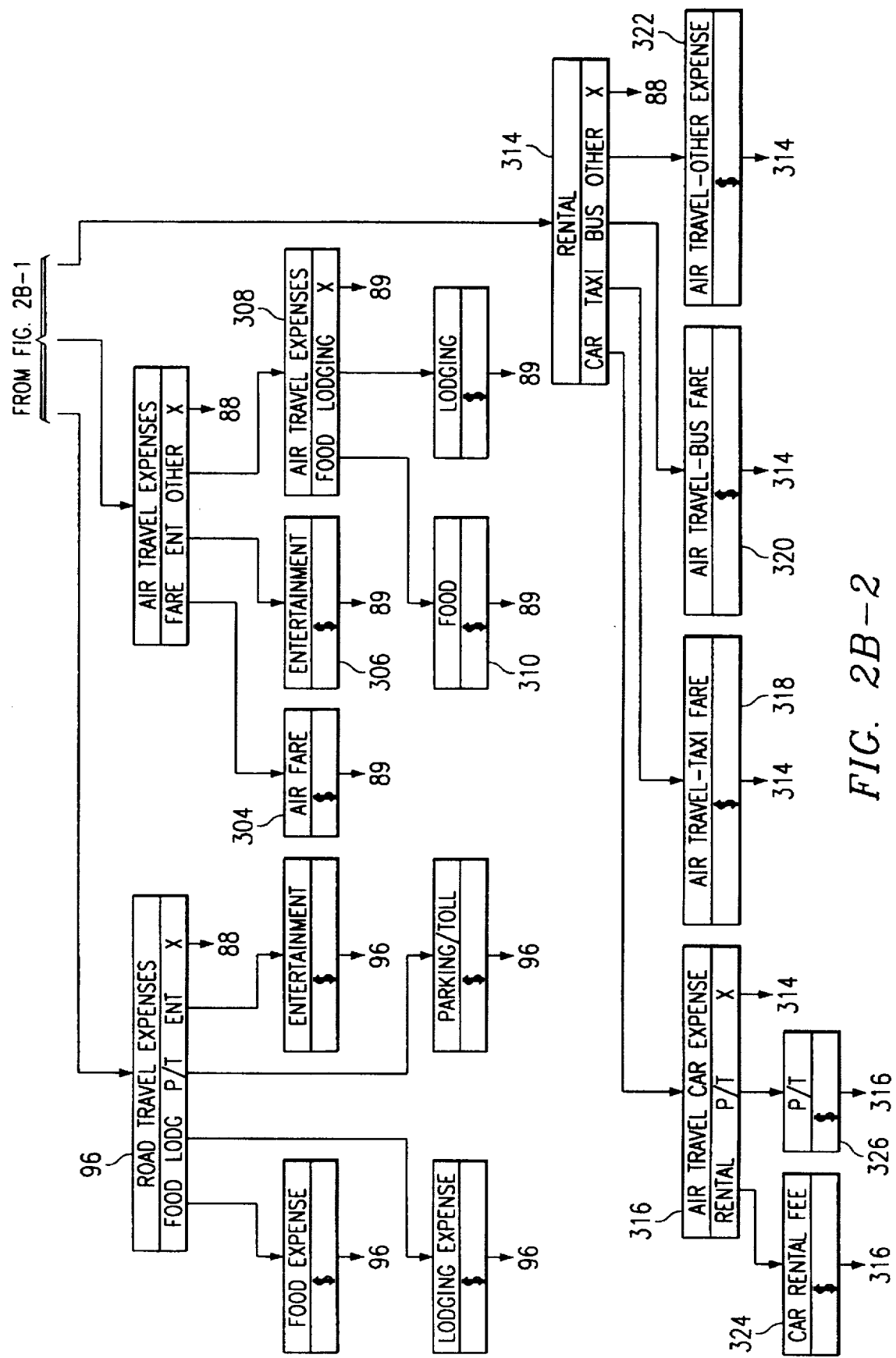
Figure 3:
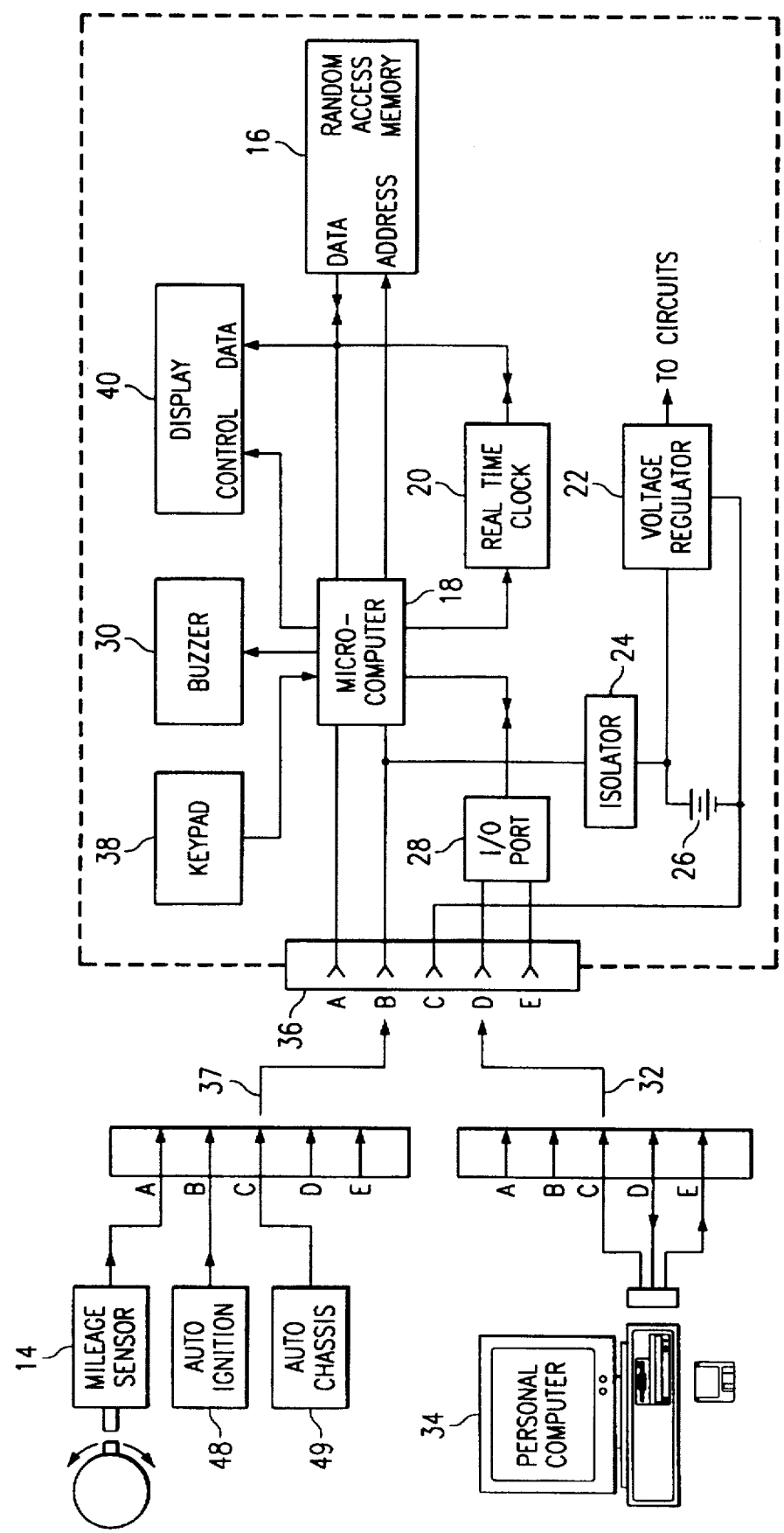

Although many different methods of operation of the device can be conceived, for ease of use the device is designed to use a memory driven logic sequence as shown in FIGS. 2A and 2B. The 10 decimal keys (42) of the device are used merely to enter numerical information into the device. The E or Enter key (44) is used to enter the information that has been shown on the display (40). The key element in the processing of information through the device is the C/B key (46). This key acts as a prompt for the menu to permit the selection of the appropriate choice on the menu for selection by use of the E or Enter key (44).

In actual operation, if no first input means is attached to the data storage and internal processing means, the device for the computerized recording of mileage and expenses can operate as a stand-alone menu driven data gathering and storage device.

Although many different, logical sequences of operation can be visualized from the description of the device, one of the critical elements of this device is its ability to function using menu driven capability, specifically through the E (44) key and the C/B key (46). The device provides significantly more flexibility than any other similar type device previously disclosed. In one method of operation, see Exhibits 2A and 2B, the E key (44) is pressed once to turn the device (10) on. At that point, the microcomputer (18) checks data transfer and receiving connector (36) to ascertain whether the mileage sensor (14) is connected and checks to see if a low battery warning or memory full warning should be shown on the display (40) or by use of the buzzer (30). If no mileage sensor (14) is connected and no warning need be issued, the microcomputer (18) sends the first prompt screen to the user. The user then selects the appropriate function by striking the C/B key (46) on the keypad (38), causing the microcomputer (18) to sequentially select between the choices offered in response to input from the C/B key. Once the user has selected the appropriate function, that function is executed by pressing the E key (44).

To illustrate a typical method of entry, assume that the user wishes to start a business trip. Once the main menu is selected, the user will execute the TRIP prompt by pressing the C/B key (46) and strike the E key (44). Upon execution of the TRIP command in the main menu (50), the prompt will change to that of element 52 shown on FIG. 2A. The user then presses the C/B key to move the cursor to the prompt labelled BUS (abbreviation for "BUSINESS") and presses the E key (44). If a trip is not in progress, the nature of the trip (BUS) will be temporarily stored and the display will be changed to the prompt of element 58, FIG. 2A, allowing the user to manually enter the current vehicle odometer reading by pressing the appropriate numeral keys on the keypad (42). Correction of an erroneous entry can be made before pressing the E key (44), by pressing the C/B key (46) to backspace over the mistake, allowing re-entry of the correct information.

After the mileage digits are entered, the E key is pressed, causing the microcomputer (18) to temporarily store the mileage and then proceed to the trip and client code prompt (60). The user, using the numeric keys enters the numeric trip code and presses E. The cursor now changes to the client code field of prompt and the user enters that numeric code and presses E. At this point, the microcomputer (18) selects a starting address for the new data field and sends this to the RAM (16). The microcomputer then sends the data entered by the user plus the time and date from the real time clock (20) to the RAM (16). Once completed, the microcomputer (18) sends the trip menu prompt (52) data to the display (40), allowing the user the choice of entering either additional trip data or returning to the main menu (50) for setting up or changing setup data in the device (10) or turning the device off.

It is to be noted that, in the event the user wishes to start a second trip before the first trip is ended, the microcomputer (18) as programmed will force the user to end the previous trip by sending an end miles prompt for the previous trip before allowing the start of another trip in any category.

If, at the main menu (50), the user wishes to enter expenses, he would press the C/B key (46) to select the EXPENSES prompt and, when at the EXPENSES prompt, would press the E key (44). The microcomputer (18) would then send the BUSINESS EXPENSES prompt (78) to the display (40). This prompt would give the user the choice of making entries in either AUTO or TRAVEL categories. Note that there is a prompt X in most menu items. These prompts, when selected, will exit the present menu position and cause the previous menu screen to be displayed.

If the user wishes to enter, for example, a fuel expense, the AUTO prompt (78) would be selected with the C/B key (46) and the E key (44) pressed. This action would cause the prompt to change to that which is shown in 80. Using the C/B key, FUEL would be selected. After pressing the E key, the prompt would change to that of (82), allowing numeric entry of digits corresponding to the volume of fuel purchased. Pressing the E key would cause the digits entered to be temporarily stored in the microcomputer (18) as gallons along with data identifying these digits as business expense for automobile fuel. After the microcomputer (18) has temporarily stored the aforementioned data, it causes the prompt to change to one which will allow the user to enter the cost of the fuel purchased. The user, using the numeric keys (42) of the keypad (38) enters digits representing the cost of fuel purchased and, when satisfied that the entry is correct, presses the E key causing the microcomputer to select a starting address for the new data field and send this to the RAM (16). The microcomputer would then send the data entered by the user and temporarily stored in the microcomputer (18) plus the time and date from the real time clock (20) to the RAM (16). At this point, the microcomputer (18) would send the data for the AUTO EXPENSE screen (80) to the display (40). The user could then either select another category of auto-related expense for entry or could use the X function to return to the BUSINESS EXPENSES menu (78) to enter a travel-related expense or could, by selecting X again, return to the MAIN MENU (50), where the unit (10) could, for example, be turned-off by selecting OFF and pressing the E key (44).

If the mileage sensor (14) is connected to the device (10), the device (10) will automatically keep track of miles driven and will automatically enter its internal mileage reading into the RAM (16) when required. In order to correlate the number of pulses from the mileage sensor (14) to miles, a calibration procedure is selectable while in the SETUP mode (101). (See FIG. 2). Additionally, the unit (10) is designed to detect if it is connected to a mileage sensor to which it has not been calibrated. In this case, the microcomputer (18) will send a prompt to the display (40) warning of this fact and allowing either a recalibration of the odometer function of the unit or manual entry of miles. This feature reduces the possibility of erroneous distance readings being logged because of user error.

Another feature of the device (10) is one which allows the user to configure the device (10) using SETUP (50). Included in these setup entries are those which will allow the user to set the real time clock (20), enter service interval warning settings and calibrate the mileage sensor (14) against the automobile's odometer.

Because the device (10) is to be used in a wide variety of vehicles, there must be a means of correlating the number of revolutions of the driveshaft or axle which the mileage sensor (14) senses to the number of miles traveled. To calibrate the odometer of the device (10); the user, upon selecting SET UP (101) from within the setup routine, will be led, through prompts, to the TO START 10 MILE CALIB. RUN. PRESS ENTER prompt (208). After noting the exact reading of the odometer on the vehicle, the user presses the E key (44). The microcomputer (18) starts counting mileage sensor (14) pulses and changes the display to prompt TO END 10 MILE CALIB RUN, PRESS ENTER (210). At the point where the vehicle has traveled exactly ten miles, the user presses the E key (44) which causes microcomputer (18) to divide the number of pulses received from mileage sensor (14) by 100 to give a pulse count per tenth mile. The microcomputer (18) uses this factor to calculate the distance traveled by the vehicle.

If the mileage sensor (14) is used, a connection to the vehicle's ignition switch (48) and the chassis ground (49) of the vehicle will, upon activation of the ignition switch (48), cause a signal to be sent to the microcomputer (18) which will cause the buzzer (30) to sound to warn the user to make an entry. If no entry is made and, for example, a trip is in progress and the device (10) has not been removed and replaced in the vehicle since the last time the vehicle was driven, the microcomputer (18) will simply continue to log miles for the trip in progress.

If the unit (10) is removed and replaced in the vehicle, upon turning on of the vehicle's ignition (48), the microcomputer (18) will sense the removal and reconnection at the data transfer and receiving connector (36) and will cause the buzzer (30) to sound and will send to the display the ENTER CURRENT MILEAGE prompt (200). Upon pressing the E key (44) after entering the current vehicle odometer reading using the numeric keys (42), the microcomputer (18) will cause the main menu (50) to be sent to the display (40), continuing normal mileage logging or expense entry.

It should be noted that all of the features of the device (10) may be selected and all entries made by using only twelve keys, ten of these keys being the usual numeric keys (42), the eleventh being an Enter or E key (44) and the twelfth being a dual function program selectable key, the C/B key (46). The twelfth key is automatically configured by program code stored in the microcomputer (18) to be either a cursor moving key or a destructive backspace key. This feature allows very flexible operation of the device (10) while keeping key count (and, consequently, cost) low. Operation of the device (10) is simplified by the use of intelligent control of the function of the C/B key (46).

Before the commencement of a journey, after the device (10) is turned on, the logic cycle of the device permits an initial entry of either the trip or expense category. If the trip category is selected, the next alternative is the start or end of the trip. If the start is selected, then the purpose of the trip can be entered, either personal, business, charitable or other. Once that characteristic of the trip is chosen, the starting mileage can be set. After returning to the original trip/expense category, the same information can be provided for the end of the trip. In addition, expenses can be entered using the logic tree as shown in FIGS. 2 and 2A. Among the expenses that can be shown are fuel, repairs, service, food, lodging, personal and business, entertainment expenses, etc. Since the unit is entirely menu driven, the only key that moves the categories is the cursor key. The decimal pad is used only to enter numeric information into the display. All entries of data are made by the entry key.

At the end of a journey or whenever the operator of the vehicle wishes to review the information contained within the data storage means, it is removed from the vehicle and wired through the outlet plug (36) to the personal computer (34). The information is uploaded into the personal computer and the information is turned into data for ready access to the operator of the vehicle.

In an alternative arrangement the device can be connected into the starting circuit (48) of the vehicle, thus, preventing operation of the vehicle until an identification code is entered. This can be used to prevent unauthorized use of the vehicle.

As a further alternative, the device can be programmed to accept a number of different identification codes prior to operation, thus, disclosing the travel parameters of each individual using the vehicle.

What is claimed:

1. A computerized information processing system mounted in a vehicle, capable of communicating with an external data processor, said computerized information processing system comprising:

a mileage sensor securable to the vehicle for automatically inputting information from said vehicle representative of distance traveled by said vehicle;

a manual menu-driven input, operable by the occupant of said vehicle, having a display and a keypad for entering both vehicular and non-vehicular information, said vehicular information including data regarding cumulative vehicle travel mileage and vehicle operating expenses, said non-vehicular information including travel expenses and characterization of said vehicle operating expenses and said travel expenses for tax purposes;

a data storage and internal processor responsive to said mileage sensor and manual input, having a microcomputer, a real time clock, random access memory, a program for displaying a menu of data category options on said display, a selector associated with said display and said keypad for permitting said occupant to select one or more of said options, and a communications port adapted to permit communication between the microcomputer and the external data processor and a calibration system operable to calibrate the computerized information processing system with an odometer of the vehicle, such that said information representative of distance traveled corresponds to actual distance traveled as measured by said odometer.

2. The information processing system of claim 1 further comprising a cable to connect the communications port directly to the external data processor.

3. The information processing system of claim 1, wherein said selector is operable solely through use of a cursor/backspace key and an enter key.

4. The information processing system of claim 1, further comprising means for warning said vehicle occupant when said vehicle requires maintenance service.

5. The information processing system of claim 1, further comprising security means associated with said manual input, for starting said vehicle only after said occupant has entered a code into said manual input.

6. The system of claim 1, wherein said mileage sensor comprises a magnetic flux detector, and further comprising:
a driveshaft; and
a magnet coupled to said driveshaft, such that said magnetic flux detector detects rotations of said driveshaft.

7. The system of claim 1, wherein said mileage sensor comprises a magnetic flux detector, and further comprising:
an axle; and
a magnet coupled to said axle, such that said magnetic flux detector detects rotations of said axle.

8. The system of claim 1, wherein said mileage sensor comprises an odometer reading device.

* * * * *